(12) United States Patent
Chun et al.

(10) Patent No.: US 8,792,457 B2
(45) Date of Patent: Jul. 29, 2014

(54) COMMUNICATING CONTROL INFORMATION IN MOBILE COMMUNICATION SYSTEM

(75) Inventors: Sung Duck Chun, Anyang (KR); Young Dae Lee, HaNam-shi (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 12/486,622

(22) Filed: Jun. 17, 2009

(65) Prior Publication Data

US 2009/0257394 A1  Oct. 15, 2009

Related U.S. Application Data

(63) Continuation of application No. 11/429,114, filed on May 4, 2006.

(30) Foreign Application Priority Data

May 6, 2005 (KR) .......................... 10-2005-0038143

(51) Int. Cl.
*H04B 7/216* (2006.01)
(52) U.S. Cl.
USPC ........................................ 370/335; 455/422.1
(58) Field of Classification Search
None
See application file for complete search history.

(56) References Cited

U.S. PATENT DOCUMENTS

| 6,442,241 B1 | 8/2002 | Tsumpes |
| 2004/0120253 A1 | 6/2004 | Forssell et al. |
| 2005/0041681 A1 | 2/2005 | Lee et al. |
| 2005/0085246 A1 | 4/2005 | Benco et al. |
| 2005/0213497 A1 | 9/2005 | Cho et al. |
| 2005/0249138 A1 | 11/2005 | Heo et al. |
| 2005/0265301 A1 | 12/2005 | Heo et al. |
| 2006/0143444 A1 | 6/2006 | Malkamaki et al. |
| 2006/0268821 A1* | 11/2006 | Terry ............................ 370/349 |
| 2007/0211684 A1* | 9/2007 | Lee et al. ...................... 370/342 |

FOREIGN PATENT DOCUMENTS

| AU | 735582 | 12/1998 |
| EP | 1298856 | 4/2003 |
| EP | 1427245 | 6/2004 |
| EP | 1501328 | 1/2005 |
| GB | 2342823 | 4/2000 |
| JP | 2005073276 | 3/2005 |
| JP | 2007511286 | 5/2007 |
| JP | 2007520153 | 7/2007 |
| WO | 2005-078967 | 8/2005 |
| WO | 2005/109690 | 11/2005 |

OTHER PUBLICATIONS

RAN WG2, "Correction on MAC-e PDU Format," R2-053085, 3GPP TSG-RAN WG2 Meeting #49, Nov. 2005.

(Continued)

*Primary Examiner* — German J Viana Di Prisco
(74) *Attorney, Agent, or Firm* — Lee, Hong, Degerman, Kang & Waimey

(57) ABSTRACT

The present invention relates to communicating control information in a mobile communication system, wherein the control information of a mobile terminal for scheduling an uplink channel may be notified to a network more quickly with less power. The present invention comprises transmitting a data block on a first physical channel, wherein the data block comprises control information, and transmitting an indicator having a specific value on a second physical channel for indicating the transmission of the control information on the first physical channel.

6 Claims, 7 Drawing Sheets

(56) References Cited

OTHER PUBLICATIONS

3rd Generation Partnership Project (3GPP), "Universal Mobile Telecommunications System (UMTS); FDD Enhanced Uplink; Overall Description; Stage 2 (Release 6)," ETSI TS 125 309 v6.2.0, Mar. 2005.

LG Electronics Inc., "MAC-e PDU Format for Control Information", 3GPP TSG-RAN WG2 Meeting #45bis, R2-050076, XP-002583398, Jan. 10, 2008.

Samsung, "MAC-e Control Information Format", 3GPP TSG-RAN2 Meeting #46, Tdoc R2-050345, XP-002583402, Feb. 14, 2005.

Taiwan Intellectual Property Office Application Serial No. 095116155, Office Action dated May 15, 2013, 12 pages.

* cited by examiner

COMMUNICATING CONTROL INFORMATION IN MOBILE COMMUNICATION SYSTEM

CROSS-REFERENCE TO RELATED APPLICATIONS

This application is a continuation of U.S. application Ser. No. 11/429,114, filed on May 4, 2006, now U.S. Pat. No. 8,665,836, which claims the benefit of earlier filing date and right of priority to Korean Application No. P2005-0038143, filed on May 6, 2005, the contents of which are hereby incorporated by reference herein in their entirety.

FIELD OF THE INVENTION

The present invention relates to communicating control information in a mobile communication system, wherein the control information of a mobile terminal for scheduling an uplink channel may be notified to a network more quickly with less power.

BACKGROUND OF THE INVENTION

FIG. 1 is a block diagram of a network structure of a universal mobile telecommunications system (UMTS) of a 3GPP asynchronous IMT-2000 system. Referring to FIG. 1, a UMTS mainly includes a user equipment (UE), a UMTS terrestrial radio access network (UTRAN), and a core network (CN).

The UTRAN includes at least one radio network sub-system (hereinafter abbreviated RNS). The RNS includes one radio network controller (RNC) and at least one base station (Node B) managed by the RNC. At least one or more cells exist in one Node B.

FIG. 2 is an architectural diagram of a radio interface protocol between the UE (user equipment) and the UTRAN (UMTS terrestrial radio access network). Referring to FIG. 2, a radio interface protocol vertically includes a physical layer, a data link layer, and a network layer. Horizontally, the radio interface protocol includes a user plane for data information transfer and a control plane for signaling transfer.

The protocol layers in FIG. 2 can be divided into a first layer (L1), a second layer (L2), and a third layer (L3) such as the three lower layers of an open system interconnection (OSI) standard model widely known in the art. The respective layers in FIG. 2 are explained as follows.

A physical layer (PHY) is the first layer and offers an information transfer service to an upper layer using a physical channel. The physical layer (PHY) is connected to a medium access control (MAC) layer located above the physical layer PHY via a transport channel. Data is transferred between the MAC layer and the PHY layer via the transport channel. Moreover, data is transferred between different physical layers, and more particularly, between a physical layer of a transmitting side and a physical layer of a receiving side via the physical channel.

The MAC layer of the second layer offers a service to a radio link control (RLC) layer located above the MAC layer via a logical channel. The RLC layer supports reliable data transfer and is operative in segmentation and concatenation of RLC service data units sent down from an upper layer. Hereinafter, the service data unit will be abbreviated SDU.

A broadcast/multicast control (BMC) layer schedules a cell broadcast message (CB message) delivered from a core network and facilitates broadcasting the message to UEs existing in a specific cell(s). From a UTRAN perspective, the CB message is delivered from a higher layer and is additionally provided with information such as a message ID, a serial number, and a coding scheme, for example. The CB message is delivered to an RLC layer in a BMC message format, and is then delivered to a MAC layer via a logical channel, such as a common traffic channel (CTCH). The logical channel CTCH is mapped to a transport channel, such as a forward access channel (FACH) and a physical channel, such as a secondary common control physical channel (S-CCPCH).

A packet data convergence protocol (PDCP) layer lies above the RLC layer and enables data, which is transferred via a network protocol such as an IPv4 or IPv6, to be efficiently transferred on a radio interface having a relatively small bandwidth. For this, the PDCP layer facilitates reducing unnecessary control information used by a wired network. This function is called header compression, for which a header compression scheme such as RFC2507 or RFC3095 (robust header compression: ROHC), defined by the Internet Engineering Task Force (IETF), can be used. In these schemes, only information mandatory for a header part of data is transferred, thereby reducing data volume to be transferred by transferring a smaller amount of control information.

A radio resource control (RRC) layer is located on a lowest part of the third layer. The RRC layer is defined in the control plane only and is associated with the configuration, reconfiguration and release of radio bearers (RBs) for controlling the logical, transport and physical channels. In this case, the RB is a service offered to the second layer for a data transfer between the UE and the UTRAN. Specifically, the RB is a logical path provided by Layer 1 and Layer 2 of a radio protocol for the data delivery between the UE and the UTRAN The configuration of the RB is a process of regulating characteristics of protocol layers and channels necessary for offering a specific service and a process of setting their specific parameters and operational methods, respectively.

The RRC layer broadcasts system information via a broadcast control channel (BCCH). System information for one cell is broadcast to the UE via a system information block (SIB) format. In case that the system information is changed, the UTRAN transmits BCCH modification information to the UE via a paging channel (PCH) or a forward access channel (FACH) to induce the UE to receive the latest system information.

According to the recent demand for high speed and capacity increment of uplink data in a wireless mobile communication system, a high-speed packet communication system in uplink wherein a user equipment transmits data to a base station is actively discussed. Enhanced uplink dedicated channel (E-DCH) technology is representatively discussed in the 3GPP WCDMA wireless mobile communication system. In the E-DCH technology, uplink packet scheduling by a base station (Node B), HARQ (Hybrid ARQ) in a physical layer and the like are introduced into the conventional 3GPP WCDMA uplink DCH (dedicated channel) to enhance efficiency of uplink.

FIG. 3 is a diagram of a structural example of DCH and E-DCH. Referring to FIG. 3, both DCH and E-DCH are transport channels that can be dedicatedly used by one user equipment (UE). In particular, the E-DCH is used by a user equipment to transfer data to a UTRAN in uplink. Compared to the DCH, the E-DCH can transfer uplink data faster than the DCH. To transfer data at high speed, the E-DCH adopts a technique such as hybrid automatic repeat request (HARQ), adaptive modulation and coding (AMC) and scheduling controlled by a Node B, for example.

For E-DCH, the Node B transfers to the UE downlink control information for controlling the UE's E-DCH transfer. The downlink control information includes response information (ACK/NACK) for HARQ, channel quality information for AMC, E-DCH transport rate assignment information, E-DCH transport start time and transport time interval assignment information, and transport block size information, for example. Meanwhile, the UE transfers uplink control information to the Node B. The uplink control information includes E-DCH rate request information for Node B controlled scheduling, UE buffer status information, and UE power status information, for example. The uplink and downlink control information for E-DCH is transferred via a physical control channel such as an enhanced dedicated physical control channel (E-DPCCH).

A MAC-d flow is defined between a MAC-d sublayer and a MAC-e sublayer for E-DCH. In this case, a dedicated logical channel is mapped to the MAC-d flow. The MAC-d flow is mapped to a transport channel E-DCH, and the E-DCH is mapped to another physical channel E-DPDCH (enhanced dedicated physical data channel). On the other hand, the dedicated logical channel can be directly mapped to DCH. In this case, the transport channel DCH is mapped to a dedicated physical data channel (DPDCH). The MAC-d sublayer in FIG. 3 manages the DCH (dedicated channel) as a dedicated transport channel for a specific user equipment, while the MAC-e sublayer manages the E-DCH (enhanced dedicated channel) as a transport channel used in transferring fast data in uplink.

A MAC-d sublayer of a transmitting side configures a MAC-d protocol data unit (PDU) from a MAC-d service data unit (SDU) delivered from an upper layer, i.e., an RLC layer. A MAC-d sublayer of a receiving side facilitates recovery of the MAC-d SDU from the MAC-d PDU received from a lower layer and delivers the recovered MAC-d SDU to an upper layer. In doing so, the MAC-d exchanges the MAC-d PDU with a MAC-e sublayer via a MAC-d flow or exchanges the MAC-d PDU with a physical layer via the DCH. The MAC-d sublayer of the receiving side recovers the MAC-d PDU using a MAC-d header attached to the MAC-d PDU prior to delivering the recovered MAC-d SDU to an upper layer.

A MAC-e sublayer of a transmitting side configures a MAC-e PDU from a MAC-e SDU corresponding to a MAC-d PDU delivered from an upper layer, i.e., a MAC-d sublayer. The MAC-e sublayer of a receiving side facilitates recovery of the MAC-e SDU from the MAC-e PDU received from a lower layer, i.e., a physical layer and delivers the recovered MAC-e SDU to a higher layer. In doing so, the MAC-e exchanges the MAC-e PDU with the physical layer via the E-DCH. The MAC-e sublayer of the receiving side recovers the MAC-e SDU using a MAC-e header attached to the MAC-e PDU prior to delivering the recovered MAC-e SDU to a higher layer.

FIG. 4 is a diagram of a protocol for E-DCH. Referring to FIG. 4, a MAC-e sublayer supporting E-DCH exists below a MAC-d sublayer of a UTRAN. Furthermore, a MAC-e sublayer supporting E-DCH exists below a MAC-d sublayer of a UE. The MAC-e sublayer of the UTRAN is located at a Node B. The MAC-e sublayer exists in each UE. On the other hand, the MAC-d sublayer of the UTRAN is located at a serving radio network controller (SRNC) in charge of managing a corresponding UE. The MAC-d sublayer exists in each UE.

Control information transmission for E-DCH is explained as follows. First of all, a scheduler exists at a Node B for E-DCH. The scheduler facilitates the allocation of an optimal radio resource to each UE existing within one cell to raise transmission efficiency of data in an uplink transfer at a base station from all UEs within each cell. In particular, more radio resources are allocated to a UE having a good channel status in one cell to enable the corresponding UE to transmit more data. Less radio resources are allocated to a UE having a poor channel status to prevent the corresponding UE from transmitting interference signals over an uplink radio channel.

When allocating radio resources to the corresponding UE, the scheduler does not only consider a radio channel status of a UE. The scheduler also requires control information from UEs. For example, the control information includes a power quantity the UE can use for E-DCH or a quantity of data the UE attempts to transmit. Namely, even if the UE has a better channel status, if there is no spare power the UE can use for E-DCH, or if there is no data the UE will transmit in an uplink direction, a radio resource should not be allocated to the UE. In other words, the scheduler can raise the efficiency of radio resource use within one cell only if a radio resource is allocated to a UE having a spare power for E-DCH and data to be transmitted in the uplink transfer.

Accordingly, a UE should send control information to a scheduler of a Node B. The control information can be transmitted in various ways. For instance, a scheduler of a Node B can instruct a UE to report that data to be transmitted in uplink exceeds a specific value or to periodically send control information to the Node B itself.

In case a radio resource is allocated to a UE from a scheduler of a Node B, the UE configures a MAC-e PDU within the allocated radio resource and then transmits the MAC-e PDU to a base station via E-DCH. In particular, if data to be transmitted exists, a UE sends control information to a Node B to inform the Node B that there is data to be transmitted by the UE. A scheduler of the Node B then sends information indicating that a radio resource allocation will be made to the UE based on the control information been sent by the UE. In this case, the information indicating the radio resource allocation means a maximum value of power the UE can transmit in uplink, a ratio for a reference channel, etc. The UE configures the MAC-e PDU within a permitted range based on the information indicating the radio resource allocation and transmits the configured MAC-e PDU.

In the above description, the Node B can allocate the radio resource to the UE in two ways, via an absolute grant (AG) and a relative grant (RG). The AG indicates an absolute value of a quantity of a radio resource usable by the UE. The RG indicates a variation from a quantity of a radio resource previously used by the UE. Namely, if the UE initially requests a resource allocation, the Node B allocates the radio resource to the UE using the AG. The UE then preferentially sets a serving grant (SG) to a value of the AG and transmits data in uplink within a range of the value. Thereafter, if it is decided that the SG used by the UE is insufficient by considering a channel status, a UE's buffer status, a volume of data to be transmitted and the like, the Node B sends the RG indicating that the UE can raise the SG by a predetermined quantity. If it is decided that the SG used by the UE is excessive, the Node B sends the RG indicating that the UE should lower the SG by a predetermined quantity. The UE then adjusts the SG based on the received RG and always uses the radio resource within a range smaller than the SG.

An E-DCH transport format combination indicator (E-TFCI) indicates information for a MAC-e PDU transmitted via E-DCH. Specifically, the E-TFCI indicates how much data is being delivered. If a transmitting side differs from a receiving side in making a decision regarding information for a transmitted data block, communications cannot be performed correctly. Hence, the transmitting side transmits information necessary for decoding data carried over an enhanced dedicated physical data channel (E-DPDCH), such as a size of the MAC-e PDU, each time the MAC-e PDU is transmitted via the E-DCH. As shown in FIG. 5, the MAC-e PDU is physically transmitted via the physical channel E-DP-DCH and the E-TFCI is transmitted via an enhanced dedicated physical control channel (E-DPCCH). In the related art, the MAC-e PDU transmitted via E-DPDCH may contain the data to be transmitted as well as the control information.

The E-DPCCH, which includes information essential to the decoding of the data carried over the E-DPDCH, is much stronger against errors than the E-DPDCH. Thus, a number of bits carried over the E-DPDCH are set to a smaller amount. Currently, a bit number used for the E-TFCI is 7. Accordingly, it can be known that a size of different MAC-e PDUs delivered via the E-DCH is 128 ($2^7$=128).

A hybrid automatic repeat request (HARQ) scheme is used for E-DCH to raise a probability of transmitted data successfully arriving at a receiving side and to reduce power necessary for the corresponding arrival. Accordingly, under HARQ, raising the probability of transmission success and reducing necessary power is dependent on feedback information sent from the receiving side to a transmitting side. Preferably, the feedback information notifies whether the data transmitted by the transmitting side correctly arrives at the receiving side.

For instance, if a receiving side correctly receives a packet 1 transmitted by a transmitting side, such as a UE, via a physical channel, the receiving side transmits a reception success signal or acknowledgement (ACK). If the receiving side fails to correctly receive the packet 1, the receiving side transmits a negative acknowledgement (NACK). Thereafter, the transmitting side transmits new data, i.e., a packet 2 in case that the feedback is ACK with reference to the feedback having been transmitted by the transmitting side. If the feedback is NACK, the transmitting side retransmits the packet 1. In doing so, the transmitting side attempts a transmission using both of the former packet 1 (firstly transmitted) and the latter packet 1 (secondly transmitted). If this succeeds, the receiving side transmits ACK to the transmitting side. If this fails, the receiving side transmits NACK to the transmitting side. When NACK is received by the transmitting side, the transmitting side repeats the above process. In this case, the retransmitted packet 1 should be identical to the former packet 1. If not, the receiving side is unable to recover the data correctly.

However, if the UE continues to stay in an area having a poor channel status or if data to be transmitted by the UE is sensitive to delivery delay, the UE is unable to indefinitely perform the above-explained retransmission. Therefore, the receiving side informs a UE of a maximum number of available transmissions or retransmissions. In case of receiving the NACK from the receiving side after having attempted to transmit data as many times as the maximum number of retransmissions, the UE stops attempting the transmission of the corresponding data and attempts a transmission of next data.

In the related art, a UE includes control information, such as its buffer capacity, a quantity of power usable for E-DCH and the like in a MAC-e PDU and transmits the MAC-e PDU; however, the HARQ transmission scheme is used for transmitting the MAC-e PDU. Namely, the MAC-e PDU is hardly delivered by a single transmission. Instead, several retransmissions are needed until a receiving side correctly receives the MAC-e PDU. Thus, a delivery delay corresponding to each retransmission occurs. Accordingly, since information such as a power quantity and a buffer capacity usable by a UE in uplink is frequently changed, the occurrence of the delivery delay degrades a quality of service felt by a user.

When a user uses a service such as a web page search, a quantity of data transmitted in uplink is very small. In most cases, uplink data will include only one packet. Nonetheless, in accordance with the related art method, a UE includes control information for indicating the presence of data to be transmitted in uplink in a MAC-e PDU and transmits the MAC-e PDU. A Node B then transmits information indicating a radio resource allocation. Afterward, the UE transmits the corresponding data in uplink.

However, the related art method has the following problems. First, it takes a considerable amount of time to exchange control information between the UE and the Node B. Second, in using a MAC-e PDU to send control information, the MAC-e PDU is transmitted via E-DPDCH. As mentioned in the foregoing description, E-TFCI should be used to transmit the MAC-e PDU comprising the control information via E-DPCCH because of the strength of E-DPCCH against errors. Namely, both the E-DPDCH and the E-DPCCH are used for the transmission of one control information, whereby power is considerably wasted.

SUMMARY OF THE INVENTION

The present invention is directed to communicating control information in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating control information in a mobile communication system, the method comprising transmitting a data block on a first physical channel, wherein the data block comprises control information, and transmitting an indicator having a specific value on a second physical channel for indicating the transmission of the control information on the first physical channel.

Preferably, the indicator is associated with the data block transmitted on the first physical channel, wherein the indicator indicates a size of the data block on the first physical channel. Preferably, the indicator is an enhanced transmit format combination indicator (E-TFCI), wherein the specific value comprises an E-TFCI index equaling zero.

Preferably, the first physical channel is an enhanced dedicated physical data channel (E-DPDCH) and the second physical channel is an enhanced dedicated physical control channel (E-DPCCH). Preferably, the data block is a MAC-e PDU.

Preferably, the control information comprises scheduling information, wherein the scheduling information comprises at least one of highest priority logical channel identifier, total E-DCH buffer status, highest priority logical channel buffer status, and mobile terminal power headroom.

Preferably, the data block comprises only the control information.

In accordance with another embodiment of the present invention, a mobile terminal for communicating control information in a mobile communication system comprises a processor for processing control information to be transmitted and generating a data block, and a transmitter controlled by the processor for transmitting the data block on a first physical channel, wherein the data block comprises the control information, wherein the transmitter transmits an indicator having a specific value on a second physical channel for indicating the transmission of the control information on the first physical channel.

Preferably, the indicator is associated with the data block transmitted on the first physical channel, wherein the indicator indicates a size of the data block on the first physical channel. Preferably, the indicator is an enhanced transmit format combination indicator (E-TFCI), wherein the specific value comprises an E-TFCI index equaling zero.

Preferably, the first physical channel is an enhanced dedicated physical data channel (E-DPDCH) and the second physical channel is an enhanced dedicated physical control channel (E-DPCCH). Preferably, the data block is a MAC-e PDU.

Preferably, the control information comprises scheduling information, wherein the scheduling information comprises at least one of highest priority logical channel identifier, total E-DCH buffer status, highest priority logical channel buffer status, and mobile terminal power headroom.

Preferably, the data block comprises only the control information.

In accordance with another embodiment of the present invention, a method for communicating control information in a mobile communication system comprises determining whether a specific event has occurred, transmitting an indicator for indicating a size of a data block transmitted on a physical channel if it is determined that the specific event has not occurred, and transmitting the indicator with a specific value for indicating the specific event if it is determined that the specific event has occurred.

In one aspect of the present invention, the specific event occurs when the data block comprises only control information. In another aspect of the present invention, the specific event occurs when data to be transmitted is received from an upper layer and no resources for the transmission of the data are available.

Preferably, the indicator is transmitted on a physical channel different from the physical channel through which the data block is transmitted, wherein the indicator is transmitted through an enhanced data physical control channel (E-DPCCH).

Preferably, the indicator is an enhanced transmit format combination indicator (E-TFCI), wherein the specific value comprises an E-TFCI index equaling zero.

Preferably, the data block is transmitted on an enhanced dedicated physical data channel (E-DPDCH). Preferably, the data block is a MAC-e PDU.

Preferably, the control information comprises scheduling information, wherein the scheduling information comprises at least one of highest priority logical channel identifier, total E-DCH buffer status, highest priority logical channel buffer status, and mobile terminal power headroom.

In accordance with another embodiment of the present invention, a mobile terminal for communicating control information in a mobile communication system comprises a processor for determining whether a specific event has occurred and generating a data block, and a transmitter controlled by the processor for transmitting an indicator for indicating a size of the data block transmitted on a physical channel if it is determined that the specific event has not occurred, wherein the transmitter transmits the indicator with a specific value for indicating the specific event if it is determined that the specific event has occurred.

In one aspect of the present invention, the specific event occurs when the data block comprises only control information. In another aspect of the present invention, the specific event occurs when the processor receives data to be transmitted from an upper layer and no resources for the transmission of the data are available.

Preferably, the indicator is transmitted on a physical channel different from the physical channel through which the data block is transmitted, wherein the indicator is transmitted through an enhanced data physical control channel (E-DPCCH).

Preferably, the indicator is an enhanced transmit format combination indicator (E-TFCI), wherein the specific value comprises an E-TFCI index equaling zero.

Preferably, the data block is transmitted on an enhanced dedicated physical data channel (E-DPDCH). Preferably, the data block is a MAC-e PDU.

Preferably, the control information comprises scheduling information, wherein the scheduling information comprises at least one of highest priority logical channel identifier, total E-DCH buffer status, highest priority logical channel buffer status, and mobile terminal power headroom.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
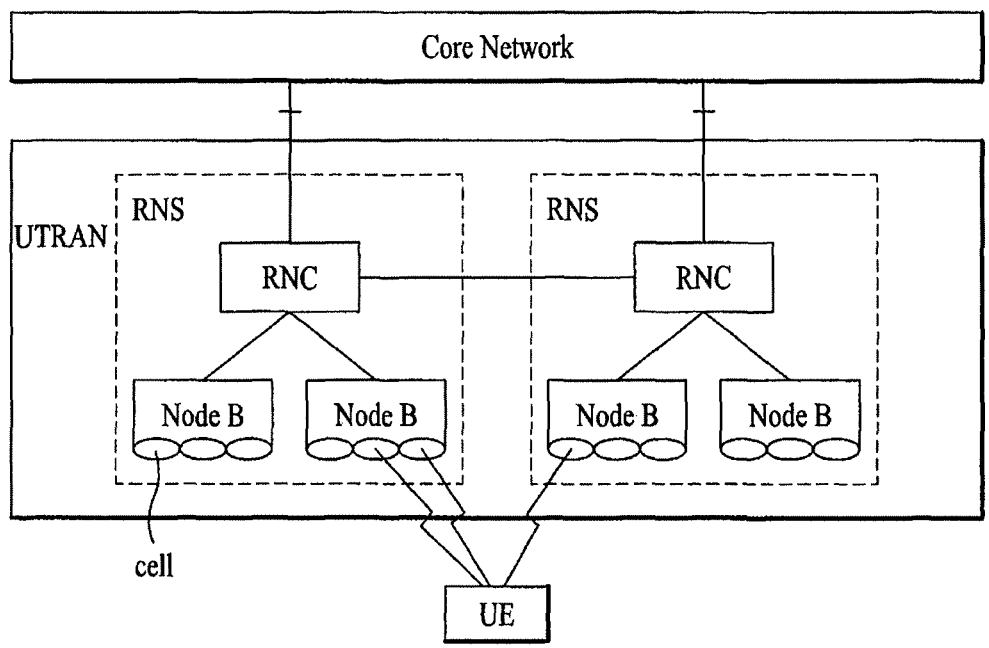
FIG. 1 is a block diagram of a network structure of a universal mobile telecommunications system (UMTS).
Figure 2:
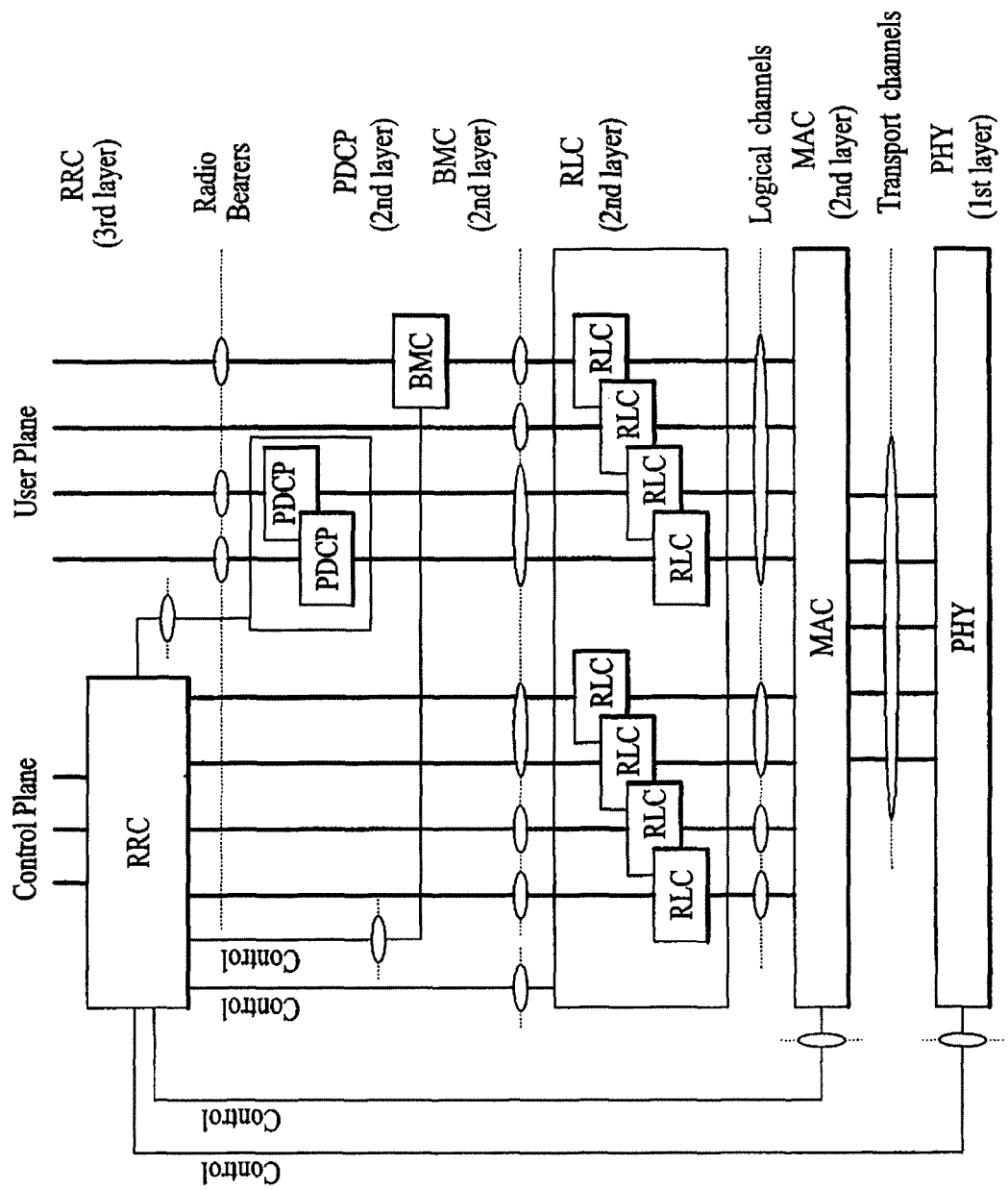
FIG. 2 is an architectural diagram of a radio interface protocol used by the UMTS.
Figure 3:
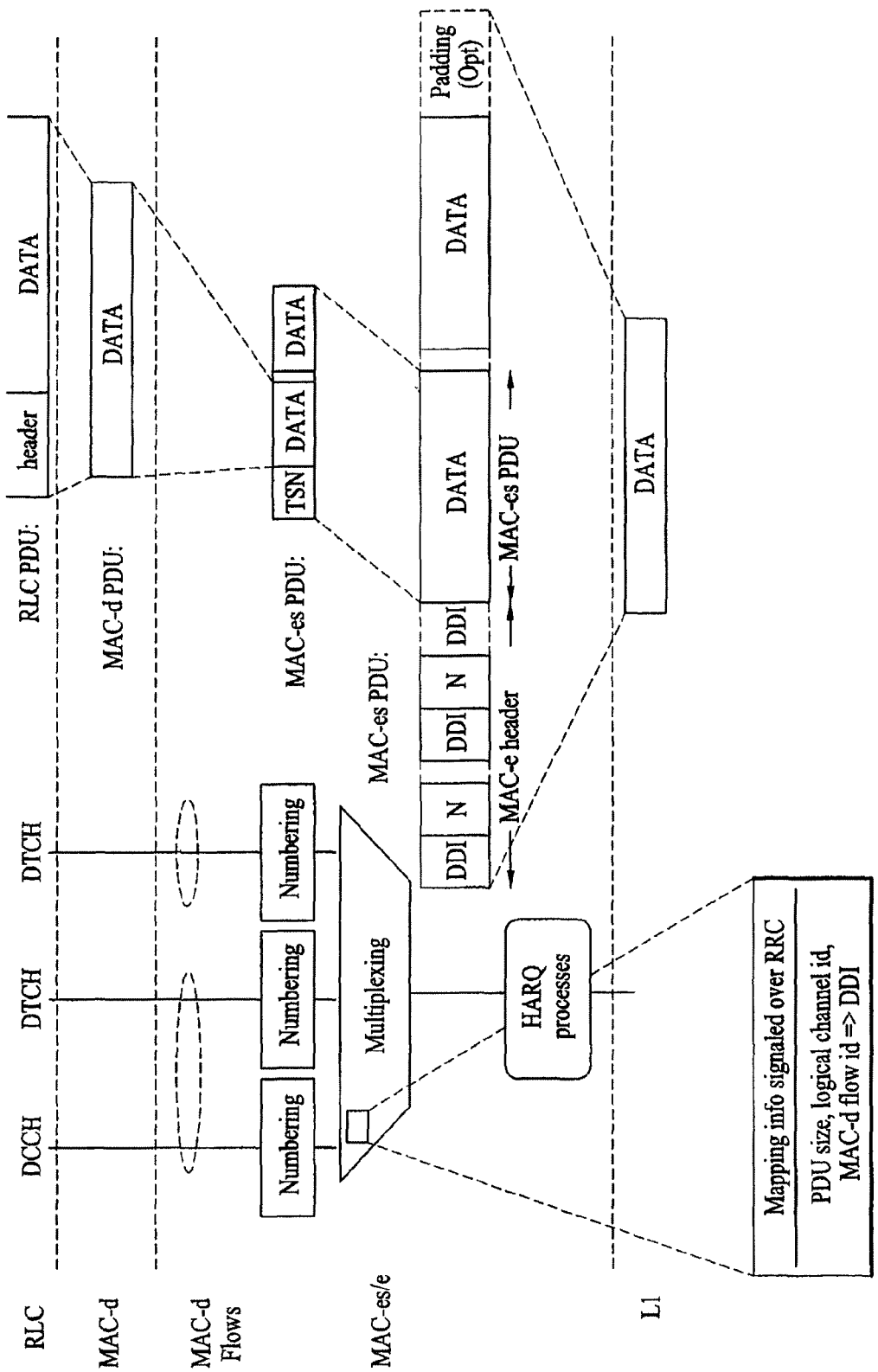
FIG. 3 is a diagram of a structural example of a dedicated channel (DCH) and an enhanced dedicated channel (E-DCH).
Figure 4:
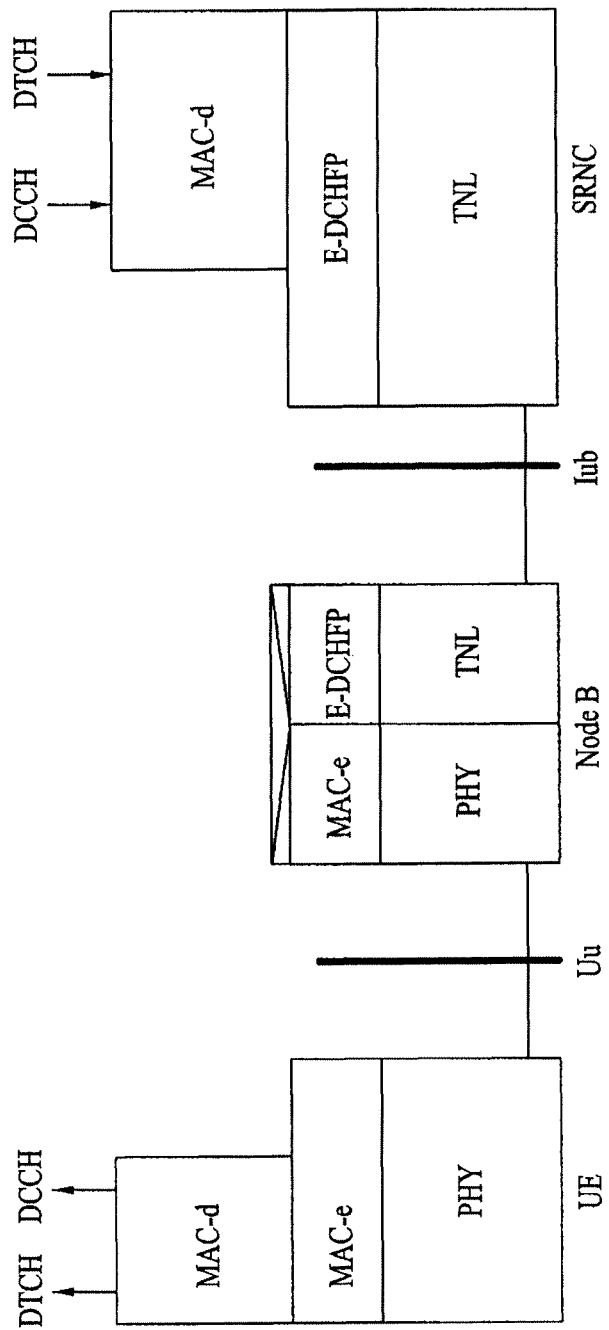
FIG. 4 is a diagram of a protocol for E-DCH.
Figure 5:
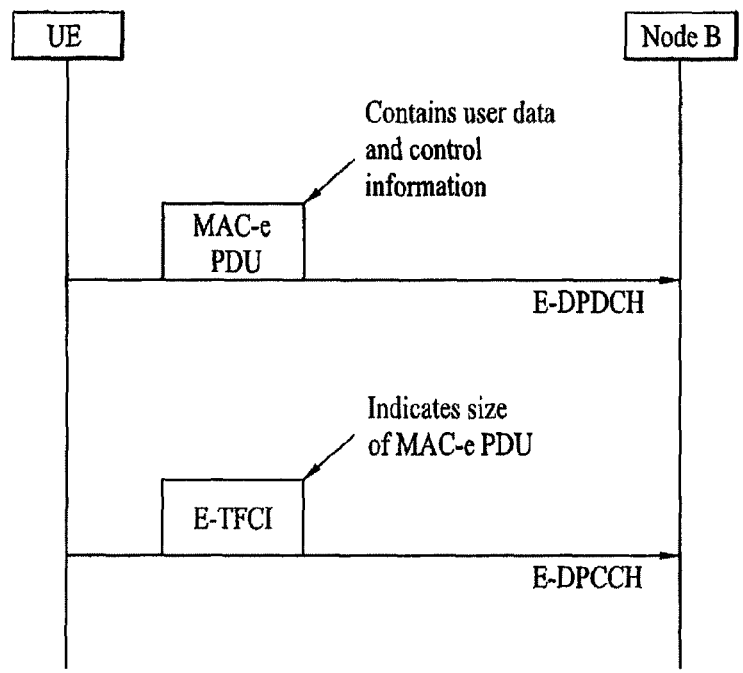
FIG. 5 illustrates transmitting a data block via an enhanced dedicated physical data channel (E-DPDCH) and transmitting an E-DCH transmit format combination indicator (E-TFCI) via an enhanced dedicated physical control channel (E-DPCCH) in accordance with the related art.

The present invention relates to communicating control information in a mobile communication system, wherein the control information of a mobile terminal for scheduling an uplink channel may be notified to a network more quickly with less power.

Reference will now be made in detail to the preferred embodiments of the present invention, examples of which are illustrated in the accompanying drawings. Wherever possible, the same reference numbers will be used throughout the drawings to refer to the same or like parts.

The present invention provides a method for communicating control information for uplink channel scheduling and a method for scheduling an uplink channel. Accordingly, UE control information for scheduling an uplink channel may be notified to a network side more quickly with less power.

In accordance with one embodiment of the present invention, specific situations associated with control information to be transmitted to a network from a UE are made to cope with indicators that can identify the specific situations. Furthermore, the indicators coping with the specific situations are respectively transmitted via an uplink control channel each time each of the situations takes place.

In one aspect of the invention, UE control information for scheduling an uplink channel is notified to a network more quickly with less power. Preferably, this is accomplished using a physical control channel of the UE.

In another aspect of the invention, in case control information a UE has to send to a network side exists, a specific area of a physical control channel is preferably used. In particular, if control information a UE has to send to a network side exists, a specific value of a specific area of a physical control channel is preferably used.

In a further aspect of the invention, in case a specific situation associated with control information for scheduling an uplink channel occurs, a UE is informed that a specific situation occurs using a specific area of a physical control channel. Preferably, in case that a specific situation occurs, a UE uses a specific value of a specific area of a physical control channel.

Preferably, the physical control channel is an enhanced dedicated physical control channel (E-DPCCH) and the specific area of the physical control channel is an area to which an E-DCH transmit format combination indicator (E-TFCI) is allocated. Preferably, the control information comprises scheduling information. Preferably, the scheduling information comprises a buffer capacity of a UE, a quantity of power usable by a UE in uplink (mobile terminal power headroom), total E-DCH buffer status, highest priority logical channel identifier, and highest priority logical channel buffer status, for example.

Preferably, the specific situation is a situation where a buffer of the UE is emptied when the UE has transmitted all data the UE has. Preferably, the specific situation includes a case where there is no more data to be transmitted despite a presence of a radio resource allocated to the UE, a case where there is no more data to configure a new MAC-e PDU, and a case where a spare space remains in a MAC-e PDU after a maximum size of the MAC-e PDU allowed by a radio resource allocated to a UE has been filled with data in a buffer, for example.

Preferably, the specific situation is a situation where data to be transmitted via an uplink channel by a UE is very small in size or can be configured with a single packet. Preferably, the present specific situation is a situation where no allocated radio resource is usable by a UE despite a presence of data to be transmitted in uplink and that the data is very small in size or corresponds to a single packet.

Preferably, the specific situation is a situation where a quantity of data to be transmitted via an uplink channel by a UE is smaller than a preset value. Preferably, the specific situation is a situation where there is data to be transmitted by a UE in uplink despite a non-presence of a UE-usable radio resource and that a size of the data is smaller than the preset value.

Preferably, if a specific situation occurs in a UE and if it is necessary to notify a network side of the occurrence of the specific situation, the UE uses a specific value of E-TFCI, such as E-TFCI=0, for example. Preferably, in accordance with one embodiment of the present invention, all available E-TFCI values are not used for indicating a size of a MAC-e PDU. Preferably, at least one value is used for indicating a specific situation occurring in the UE, as shown in FIG. 6.

Figure 6:
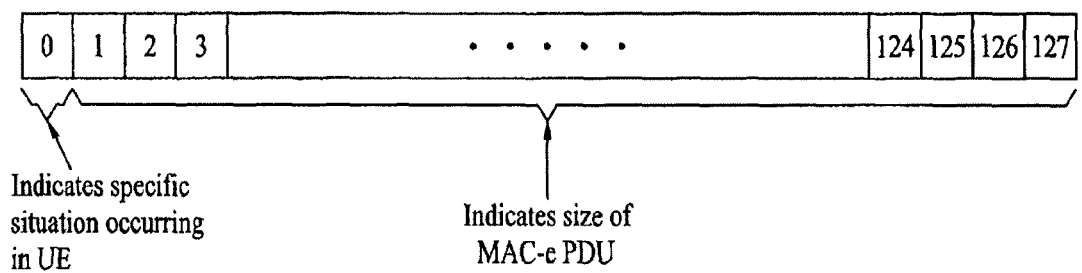
FIG. 6 illustrates using at least one specific E-TFCI value for informing a receiving side of a specific situation occurring in a transmitting side, in accordance with one embodiment of the present invention.

Referring to FIG. 6, in accordance with one embodiment of the present invention, when transmitting user data using a MAC-e PDU via E-DPDCH, a UE uses E-TFCI for indicating a size of the MAC-e PDU. When the MAC-e PDU is not used for transmitting user data, and if a specific situation occurs in a UE, at least one specific E-TFCI value is used for informing a Node B of the occurrence of the specific situation. For instance, if a 7-bit E-TFCI is transmitted via an uplink control channel capable of transmitting 10-bit of control data per one slot, $2^7$ (=128) E-TFCI combinations are possible. Accordingly, instead of allocating an E-TFCI to all 128 values, respectively, to indicate a size of the MAC-e PDU, at least one value is used as an indicator for indicating a specific situation associated with a UE's control information for uplink channel scheduling.

Figure 7:
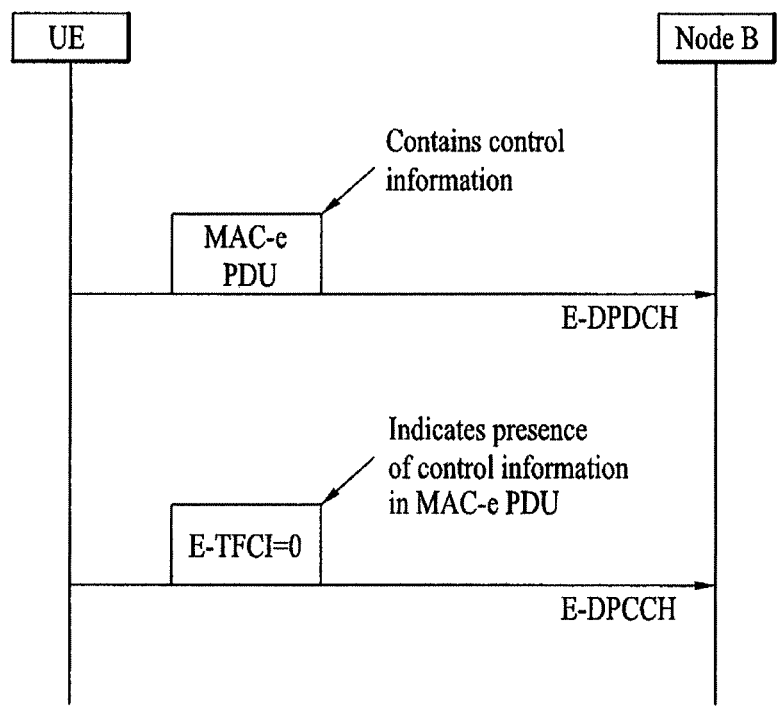
FIG. 7 illustrates transmitting a data block via E-DPDCH and transmitting a specific value of E-TFCI via E-DPCCH, in accordance with one embodiment of the present invention.

In accordance with one embodiment of the present invention, when data to be transmitted to a Node B from a UE is small in size, a specific value of E-TFCI is transmitted on E-DPCCH to indicate the presence of control information in a MAC-e PDU being transmitted on E-DPDCH, wherein the control information requests a resource allocation for the data to be transmitted. Preferably, as shown in FIG. 7, when E-TFCI=0 is physically transmitted via E-DPCCH, the MAC-e PDU comprising the control information is physically transmitted via E-DPDCH. In one aspect of the present invention, the MAC-e PDU physically transmitted via E-DPDCH contains only the control information.

Preferably, in case of receiving an indicator having the same format of E-TFCI having a specific value, such as E-TFCI=0, a system does not decode E-DPDCH. Rather, it obtains the specific situation occurring in the UE and conducts a next operation.

In accordance with one embodiment of the present invention, when a UE notifies a system that there is a single packet to be transmitted, the system does not use a relative grant (RG) rather than an absolute grant (AG). Preferably, when receiving RG despite having no radio resource allocated to a UE, the UE believes transmitting a single packet is allowed and transmits the single packet. The UE decides that a radio resource having a predetermined value is allocated to itself in the course of the packet transmission. After completing the transmission, the UE decides that no radio resource is allocated to itself.

In accordance with another embodiment of the present invention, when the UE informs the network side that there is a single packet to be transmitted in the above process, the network side can allocate a radio resource to the UE using the AG. Preferably, the UE decides that the radio resource allocation is valid while only the single packet is transmitted. Namely, the UE uses the allocated radio resource for transmitting the single packet only. In doing so, processes not used for the packet transmission recognize that there was no allocation of resource. After completing the transmission, the UE decides that no radio resource is allocated to itself.

In one aspect of the present invention, the above process may be regarded as a type of 3GPP random access channel (RACH). Preferably, when there exists data to be transmitted, a UE notifies the existence of data to be transmitted to a Node B using a specific E-TFCI value. Accordingly, the Node B permits the UE to use a radio resource via AG and RG. The UE then transmits data to the network using the radio resource.

In another aspect of the invention, instead of using the indicator having the same format of E-TFCI as stated above, preset indicators may be used when a UE's situation needs to be efficiently indicated to the Node B. Preferably, if necessary, additional indicators may be allocated for faster control information transmission. For example, a specific indicator may be allocated for each UE situation. Preferably, when a specific situation occurs in a UE, the UE transmits an indicator corresponding to the specific situation via E-DPCCH.

In a further aspect of the invention, in the above process, the indicator may be lost in a radio section. Therefore, if there is no response from a network after the UE has transmitted the indicator, the UE retransmits the indicator again. If the UE transmits a predefined indicator due to the occurrence of a specific situation in the UE, the UE continues to transmit the indicator during a predetermined time interval as many times as a count set by the network. Accordingly, a probability that the network successfully receives the indicator is raised. In the above description, the response of the network indicates that a radio resource is allocated to a UE or that the allocated radio resource is completely removed.

As mentioned above, the E-TFCI facilitates indicating a size of the MAC-e PDU. Thus, the more E-TFCIs used for indicating a specific situation occurring in the UE, the less the number of E-TFCIs used for indicating a size of the MAC-e PDU. To improve this, in accordance with one embodiment of the present invention, the network designates an E-TFCI for transmitting control information to inform the network of a UE's situation and assigns all undesignated E-TFCIs for indicating a size of the MAC-e PDU. Preferably, the UE uses all E-TFCIs, except the designated E-TFCI, for indicating a size of the MAC-e PDU.

The present invention describes a mobile communication system and is also applicable to a wireless communication system for a PDA or notebook computer provided with a wireless communication function. Terminologies described in the present invention are not limited to a range of a wireless communication system. And, the present invention is applicable to a wireless communication system using different wireless interfaces and physical layers such as TDMA, CDMA, FDMA, etc.

Contents of the present invention can be implemented with software, firmware, hardware or combination of them. In particular, the contents of the present invention are implemented using hardware logic such as code, circuit chip and ASIC in hardware or by codes in a computer-readable storage medium such as a hard disc, a floppy disc and a tape, an optical storage, a ROM and a RAM using a computer programming language.

Codes stored in the computer-readable medium are accessible and executable by a processor. The codes implementing the contents of the present invention are accessible via a transmission medium or a file server on network. In this case, a code-implementing device includes a wire transmission medium such as a network transmission line, a wireless transmission medium, signaling, wireless signaling, IR signaling and the like.

Figure 8:
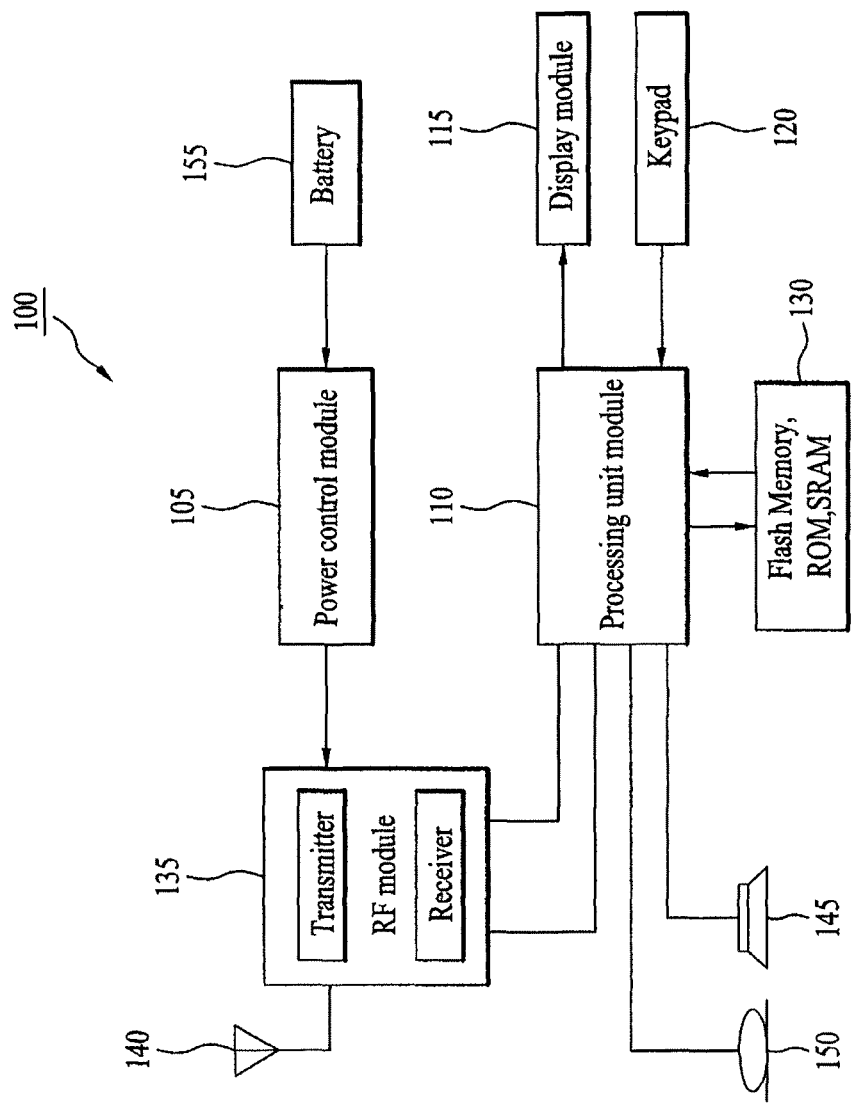
FIG. 8 is a block diagram of a wireless communication apparatus, in accordance with one embodiment of the present invention.

FIG. 8 is a block diagram of a wireless communication apparatus 100 such as a mobile terminal that performs functions of the present invention.

Referring to FIG. 8, a wireless communication apparatus 100 includes a processing unit module 110 such as a microprocessor and a digital processor, an RF module 135, a power control module 106, an antenna 140, a battery 155, a display module 115, a keypad 120, a storage module 130 such as a ROM, an SRAM, and a flash memory, a speaker 145 and a microphone 150.

A user inputs command information such as a phone number by pressing a button or activates voice using the microphone 145. The processing unit module 110 receives and processes the command information to perform a function requested by the user. The processing unit module 110 searches the storage module 130 for data necessary for performing the function and then uses the data. And, the processing unit module 110 enables the user's command information and the data searched from the storage module 130 to be displayed on the display module 115 for user's convenience.

The processing unit module 110 delivers information to the RF module 135 to transmit a radio signal including voice communication data. The RF module 135 includes a transmitter and a receiver to transmit and receive the radio signal. The radio signal is finally transmitted or received via the antenna 140. Once receiving the radio signal, the RF module 135 converts the radio signal to a baseband frequency to enable the processing unit module 110 to process the radio signal. The converted signal is delivered via the speaker 145 or as readable information.

The RF module 135 is used in receiving data from a network or transmitting information measured or generated by the wireless communication apparatus to the network. The storage module 130 is used in storing the information measured or generated by the wireless communication apparatus. And, the processing unit module 110 is appropriately used for the wireless communication apparatus to receive data, process the received data and transmit the processed data.

Preferably, the processing unit module 110 is adapted to process control information to be transmitted and generate a data block. The transmitter of the RF module 135 is controlled by the processor unit module 110 for transmitting the data block on a first physical channel, wherein the data block comprises the control information. The transmitter is also adapted to transmit an indicator having a specific value on a second physical channel for indicating the transmission of the control information on the first physical channel.

Preferably, the processing unit module 110 is adapted to determine whether a specific event has occurred and generate a data block. The transmitter of the RF module 135 is controlled by the processing unit module 110 for transmitting an indicator for indicating a size of the data block transmitted on a physical channel if it is determined that the specific event has not occurred. The transmitter also transmits the indicator with a specific value for indicating the specific event if it is determined that the specific event has occurred.

Accordingly, the present invention can communicate control information for uplink channel scheduling to a network with less power more quickly.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for a receiver to receive control information via a physical control channel from a transmitter in a mobile communication system, the method comprising:

receiving the control information via the physical control channel from the transmitter,
- wherein the control information comprises an indicator having a specific value selected from among a plurality of values,
- wherein each of the plurality of values, other than the specific value, is predetermined between the transmitter and the receiver to indicate each size of data to be received via a physical channel associated with the physical control channel,
- wherein the indicator having the specific value is used to inform the receiver of a specific situation that occurred at the transmitter,
- wherein the specific situation is related to a situation where the transmitter has transmitted data via the physical channel using only a part of available room of the physical channel for transmitting data and is unrelated to indicating each size of the data to be received via the physical channel by the indicator; and receiving data via the physical channel based on the identified situation.

2. The method of claim 1, wherein the data is received in a form of a Medium Access Control Protocol Data Unit (MAC PDU).

3. The method of claim 1, wherein the control information further comprises a transmission power related parameter.

4. A receiving end device for receiving control information via a physical control channel from a transmitting end device in a mobile communication system, the receiving end device comprising:

an RF module including a transmitter and a receiver, wherein the receiver is configured to receive the control information via the physical control channel from the transmitting end device, wherein the control information comprises an indicator having a specific value selected from among a plurality of values, wherein each of the plurality of values, other than the specific value, is predetermined between the receiving end device and the transmitting end device to indicate each size of data to be received via a physical channel associated with the physical control channel, wherein the indicator having the specific value is used to inform the receiving end device of a specific situation that occurred at the transmitter, and wherein the specific situation is related to a situation where the transmitting end device has transmitted data via the physical channel using only a part of available room of the physical channel for transmitting data and is unrelated to indicating each size of the data to be received via the physical channel by the indicator; and a processing unit module coupled with the RF module, wherein the processing unit module is configured to identify that the specific situation occurred at the transmitter by using the received indicator having the specific value, wherein the processing unit module controls the receiver of the RF module to receive data via the physical channel based on the identified situation.

5. The receiving end device of claim 4, wherein the data is received in a form of a Medium Access Control Protocol Data Unit (MAC PDU).

6. The receiving end device of claim 4, wherein the control information further comprises a transmission power related parameter.

* * * * *